US010632647B2

(12) United States Patent
Kawakami et al.

(10) Patent No.: US 10,632,647 B2
(45) Date of Patent: Apr. 28, 2020

(54) HONEYCOMB STRUCTURE

(71) Applicant: NGK INSULATORS, LTD., Nagoya (JP)

(72) Inventors: Akifumi Kawakami, Nagoya (JP); Yuji Sasaki, Nagoya (JP); Mitsuhiro Ito, Nagoya (JP); Yukiharu Morita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/453,088

(22) Filed: Mar. 8, 2017

(65) Prior Publication Data
US 2017/0274554 A1    Sep. 28, 2017

(30) Foreign Application Priority Data

Mar. 25, 2016    (JP) .................................. 2016-061394

(51) Int. Cl.
*B28B 3/20*    (2006.01)
*B28B 11/14*    (2006.01)
(Continued)

(52) U.S. Cl.
CPC ................. *B28B 3/20* (2013.01); *B01J 35/04* (2013.01); *B28B 11/14* (2013.01); *B28B 11/241* (2013.01);
(Continued)

(58) Field of Classification Search
CPC ..... B28B 3/269; B28B 3/20; B28B 2003/203; B28B 11/241; B28B 11/243; B28B 11/14;
(Continued)

(56) References Cited

U.S. PATENT DOCUMENTS 4,448,828 A * 5/1984 Mochida ................ B01D 53/86
428/34.4
4,810,554 A * 3/1989 Hattori .................. F01N 3/2828
428/116
(Continued)

FOREIGN PATENT DOCUMENTS

DE    10 2014 200 676 A1    7/2014
DE    11 2013 000 720 T5    11/2014
(Continued)

OTHER PUBLICATIONS

German Office Action (with English translation), German Application No. 10 2017 002 266.6, dated Mar. 11, 2019 (7 pages).
(Continued)

*Primary Examiner* — Michael E. La Villa
(74) *Attorney, Agent, or Firm* — Burr & Brown, PLLC (57) ABSTRACT

A honeycomb structure has a pillar-shaped honeycomb structure body having porous partition walls which defines cells which forms a passage of liquid extended from an inflow end face toward an outflow end face, a circumferential wall arranged to surround a circumference of the partition walls. The honeycomb structure body has an outermost circumference cell structure including a complete cell arranged at the outermost circumference of the honeycomb structure body, a center cell structure formed by the cells arranged at a center part at an inner side to the outermost circumference cell structure, and a boundary wall arranged at a boundary part between the outermost circumference cell structure and the center cell structure. The outermost circumference cell structure and the center cell structure are formed as different structures to each other, and a thickness of the boundary wall is set to be thicker than a thickness of the circumferential wall.

7 Claims, 3 Drawing Sheets

(51) Int. Cl.
  *B28B 11/24* (2006.01)
  *B32B 1/08* (2006.01)
  *F01N 3/26* (2006.01)
  *B01J 35/04* (2006.01)
  *F01N 3/022* (2006.01)
  *F01N 3/28* (2006.01)
  *B28B 3/26* (2006.01)

(52) U.S. Cl.
  CPC .............. *B28B 11/243* (2013.01); *B32B 1/08* (2013.01); *F01N 3/0222* (2013.01); *F01N 3/26* (2013.01); *F01N 3/2828* (2013.01); *B28B 3/269* (2013.01); *B28B 2003/203* (2013.01); *F01N 2330/06* (2013.01); *F01N 2330/60* (2013.01); *F01N 2340/00* (2013.01); *Y02T 10/20* (2013.01)

(58) Field of Classification Search
  CPC .... F01N 3/26; F01N 2340/00; F01N 2330/06; F01N 3/2828; F01N 3/0222; F01N 2330/60; B01J 35/04; B32B 1/08; Y01T 10/20
  See application file for complete search history.

(56) References Cited

U.S. PATENT DOCUMENTS

| | | | | |
|---|---|---|---|---|
| 5,108,685 | A * | 4/1992 | Kragle | F01N 3/2828 264/177.12 |
| 5,538,697 | A * | 7/1996 | Abe | B01D 53/945 422/169 |
| 7,410,929 | B2 * | 8/2008 | Ichikawa | F01N 3/2828 422/177 |
| 7,488,412 | B2 * | 2/2009 | Abe | B01D 46/0024 208/179 |
| 9,073,289 | B2 * | 7/2015 | Tamai | B01D 46/247 |
| 9,156,742 | B2 * | 10/2015 | Hayashi | F01N 3/2828 |
| 9,403,339 | B2 * | 8/2016 | Murata | B01D 46/247 |
| 9,533,294 | B2 * | 1/2017 | Hayashi | F01N 3/2828 |
| 9,782,723 | B2 * | 10/2017 | Aoki | B01D 53/9431 |
| 9,782,753 | B2 * | 10/2017 | Aoki | B01D 53/9422 |
| 2002/0042344 | A1 | 4/2002 | Kondo et al. | |
| 2002/0117773 | A1 * | 8/2002 | Yamada | B01D 53/885 264/209.1 |
| 2006/0213163 | A1 | 9/2006 | Taoka et al. | |
| 2006/0228519 | A1 * | 10/2006 | Kato | C04L 335/195 428/116 |
| 2008/0202086 | A1 | 8/2008 | Ohno et al. | |
| 2009/0011181 | A1 * | 1/2009 | Mizuno | B01D 46/2429 428/118 |
| 2011/0162348 | A1 * | 7/2011 | Kim | F01N 3/2066 60/274 |
| 2014/0205794 | A1 * | 7/2014 | Tamai | B32B 3/12 428/116 |
| 2014/0212339 | A1 | 7/2014 | Kaneda et al. | |
| 2014/0287192 | A1 * | 9/2014 | Murata | B32B 3/12 428/117 |
| 2015/0005153 | A1 * | 1/2015 | Hayashi | F01N 3/2828 502/87 |
| 2015/0040763 | A1 | 2/2015 | O'Brien et al. | |
| 2017/0266908 | A1 * | 9/2017 | Kawakami | B32B 3/12 |
| 2017/0274554 | A1 * | 9/2017 | Kawakami | F01N 3/26 |
| 2017/0312688 | A1 * | 11/2017 | Crawford | C04B 38/0012 |
| 2017/0326539 | A1 * | 11/2017 | Aoki | B01D 46/247 |

FOREIGN PATENT DOCUMENTS

| | | |
|---|---|---|
| DE | 11 2013 002 164 T5 | 1/2015 |
| GB | 2 342 055 A | 4/2000 |
| GB | 2342055 A * | 4/2000 |
| JP | 2000-097019 A1 | 4/2000 |
| JP | 2002-177794 A1 | 6/2002 |
| JP | 2008-018370 A1 | 1/2008 |
| JP | 2010-071189 A | 4/2010 |
| JP | 2012-067610 A | 4/2012 |
| JP | 2013-212446 A | 10/2013 |
| WO | 2013/047790 A1 | 4/2013 |

OTHER PUBLICATIONS

Japanese Office Action (and translation obtained from the Global Dossier) from a corresponding Japanese patent application (JP-2016-061394) dated Jun. 20, 2019.

* cited by examiner

HONEYCOMB STRUCTURE

The present application is an application based on JP-2016-61394 filed on Mar. 25, 2016 with Japan Patent Office, the entire contents of which are incorporated herein by reference.

BACKGROUND OF THE INVENTION

Field of the Invention

The present invention relates to a honeycomb structure. More specifically, the present invention relates to a honeycomb structure, in which two or more cell structures are separated by a boundary wall, capable of relieving stress concentration generated near the boundary wall and preventing deterioration of a mechanical strength.

Description of the Related Art

Conventionally, in order to perform purifying processing of a harmful substance such as HC, CO, NOx or the like included in exhaust gas emitted from an engine of a vehicle or the like, a honeycomb structure loading a catalyst is used. Further, the honeycomb structure with an open end of a cell defined by porous partition walls subjected to plugging is also used as a filter for purifying the exhaust gas.

The honeycomb structure is formed as a pillar-shaped structure having partition walls which define a plurality of cells which functions as passages of the exhaust gas. Such a honeycomb structure has a cell structure in which the plurality of the cells is regularly arranged at a predetermined frequency on a plane perpendicular to a direction in which the cell is extended. Conventionally, one kind of the cell structure within the plane is arranged in one honeycomb structure, however in recent years, in order to improve purification efficiency of the exhaust gas or the like, a honeycomb structure having two or more kinds of the cell structures arranged within the plane is proposed. For example, a honeycomb structure provided with two or more kinds of the cell structures arranged within the plane by making a cell density or a cell shape different between in a center part and in a circumferential part within the plane perpendicular to the direction in which the cell is extended is proposed (for example, see Patent Documents 1 through 3).

[Patent Document 1] JP-A-2002-177794
[Patent Document 2] JP-A-2008-018370
[Patent Document 3] JP-A-2000-097019

SUMMARY OF THE INVENTION

In Patent Documents 1 through 3, as a honeycomb structure provided with two or more kinds of cell structures, for example, a honeycomb structure or the like formed such that a cell density of a center part is set to be higher and the cell density of a circumferential part is set to be lower within a plane perpendicular to a direction in which a cell is extended is disclosed. In this way, conventionally, the honeycomb structure provided with two or more cell structures having different cell densities between in the center part and in the circumferential part of the honeycomb structure is proposed.

In the honeycomb structure provided with two or more different cell structures as described above, for example, it may be considered to arrange a porous boundary wall at a boundary part of each of the cell structures. However, in the honeycomb structure in which the boundary wall is arranged at the boundary part of the cell structure, stress concentration is apt to be generated near the boundary wall where the cell structures are switched, and therefore a break is apt to be occurred in the boundary wall. Further, in the honeycomb structure provided with the boundary wall as described above, when the honeycomb formed body is formed by means of extrusion from kneaded material including ceramic raw materials, the cell is apt to be deformed near the boundary wall of the honeycomb formed body. As a result, in the honeycomb structure obtained by firing such a honeycomb formed body, a crack might be generated from the deformed cell as a starting point in use thereof or the like and therefore a mechanical strength thereof might be reduced.

The present invention is devised based on the problem of such a conventional technique. The present invention provides a honeycomb structure, in which two or more cell structures are defined by a boundary wall, capable of relieving stress concentration generated near the boundary wall and preventing deterioration of a mechanical strength.

The present inventors conducted a study repeatedly to solve the problem described above, and as a result of that, the knowledge that a thickness of a circumferential wall exerts an extremely large influence on stress concentration near the boundary wall or a deformation of the cell in forming was obtained. Further, the present inventors found that setting the thickness of the boundary wall to be thicker than a thickness of the circumferential wall enables the stress concentration near the boundary wall or the deformation of the cell in the forming to be extremely effectively inhibited, and thereby the present invention was completed. According to the present invention, a honeycomb structure described below is provided.

According to a first aspect of the present invention, a honeycomb structure is provided including a pillar-shaped honeycomb structure body having porous partition walls which define a plurality of cells to function as passages of liquid extended from an inflow end face toward an outflow end face, and a circumferential wall arranged to surround a circumference of the partition walls; wherein a cell in which the whole circumference is defined by the partition walls among the cells is referred to as a complete cell, the honeycomb structure body has an outermost circumference cell structure including the complete cell formed at the outermost circumference of the honeycomb structure body, a center cell structure formed by a plurality of the cells formed at a center part at an inner side with respect to the outermost circumference cell structure, and a boundary wall arranged at a boundary part between the outermost circumference cell structure and the center cell structure, wherein the outermost circumference cell structure and the center cell structure are formed by different structures to each other, and a thickness of the boundary wall is set to be thicker than a thickness of the circumferential wall.

According to a second aspect of the present invention, the honeycomb structure according to the first aspect is provided, wherein the thickness of the boundary wall is set to be 150% or more of the thickness of the circumferential wall.

According to a third aspect of the present invention, the honeycomb structure according to the second aspect is provided, wherein the thickness of the boundary wall is set in a range between 150% and 300% of the thickness of the circumferential wall.

According to a fourth aspect of the present invention, the honeycomb structure according to any one of the first through third aspects is provided, wherein a cell density of the center cell structure is set to be larger than a cell density of the outermost circumference cell structure.

According to a fifth aspect of the present invention, the honeycomb structure according to any one of the first through fourth aspects is provided, wherein an arrangement direction of repeated units of the cell in the center cell structure is inclined by an angle in a range between 10° and 50° with respect to an arrangement direction of repeated units of the cell in the outermost circumference cell structure.

According to a sixth aspect of the present invention, the honeycomb structure according to any one of the first through fifth aspects is provided, wherein the center cell structure is formed by two or more cell structures having different cell densities, and a center boundary wall is arranged at a boundary part of the two or more cell structures having the different cell densities.

The honeycomb structure according to the present invention can achieve effects, in the honeycomb structure with two or more cell structures separated by a boundary wall, capable of relieving the stress concentration generated near the boundary wall and preventing deterioration of a mechanical strength. Further, in the honeycomb structure according to the present invention, the deformation of the cell near the boundary wall is hardly generated in its manufacturing, and therefore the mechanical strength can be enhanced. For example, if the cell near the boundary wall is deformed, a crack might be generated from the deformed cell as a starting point, however the honeycomb structure according to the present invention can effectively prevent the generation of such a crack.

DESCRIPTION OF THE PREFERRED EMBODIMENTS

Hereinafter, embodiments of the present invention are described. However, the present invention is not limited to the embodiments described below. Accordingly, it should be understood that modification, improvement or the like may be appropriately added to the embodiments described below within the scope of the present invention based on general knowledge of a person skilled in the art.

(1) Honeycomb Structure

Figure 1:
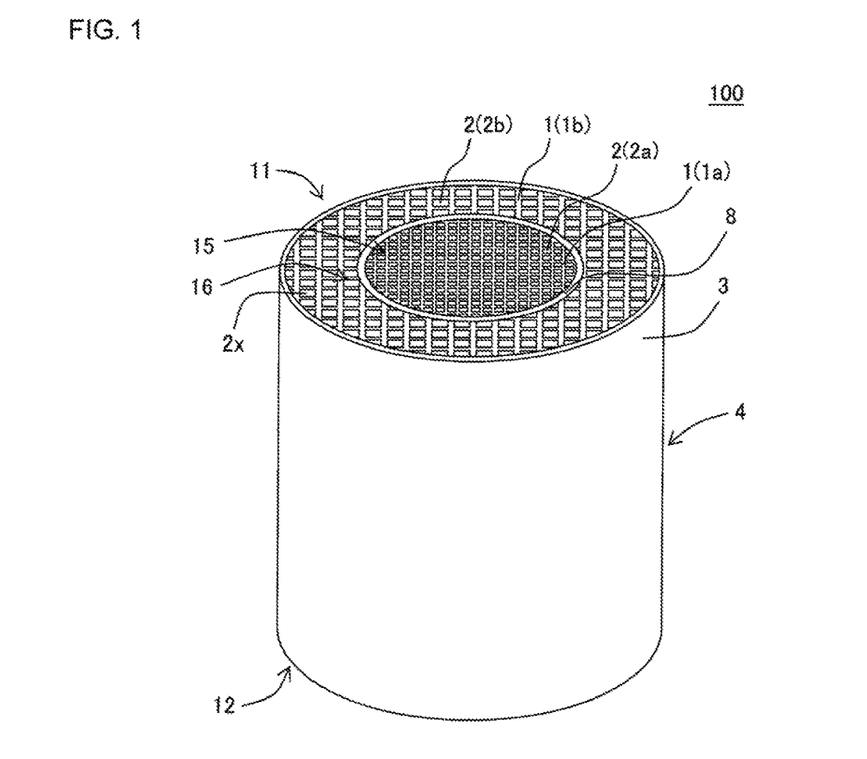
FIG. 1 is a perspective view schematically showing a honeycomb structure according to an embodiment of the present invention.
Figure 2:
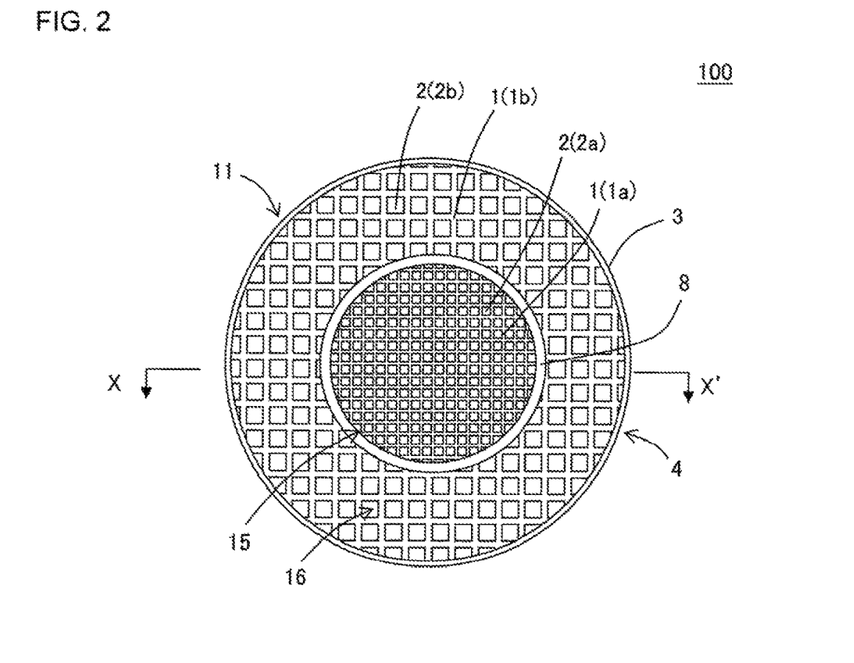
FIG. 2 is a plane view schematically showing an inflow end face of the honeycomb structure shown in FIG. 1.
Figure 3:
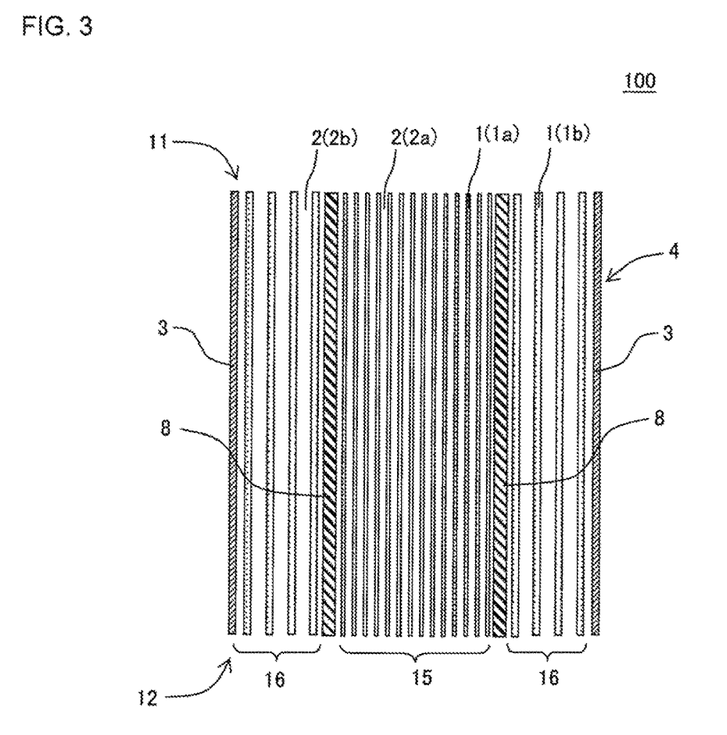
FIG. 3 is a cross-sectional view schematically showing a cross section along the X-X' line of FIG. 2.

As shown in FIG. 1 through FIG. 3, a honeycomb structure according to an embodiment of the present invention is formed as a honeycomb structure 100 provided with a pillar-shaped honeycomb structure body 4 having porous partition walls 1 and a circumferential wall 3 arranged so as to surround a circumference of the partition walls 1. The partition walls 1 of the honeycomb structure body 4 are formed to define a plurality of cells 2 to function as passages of fluid extended from an inflow end face 11 toward an outflow end face 12. The honeycomb structure 100 according to the present embodiment has a characteristic in which the honeycomb structure body 4 is formed as described below. The honeycomb structure body 4 is provided with a center cell structure 15, an outermost circumference cell structure 16, and a boundary wall 8 arranged at a boundary part between the outermost circumference cell structure 16 and the center cell structure 15. Further, the center cell structure 15 and the outermost circumference cell structure 16 are formed as different structures to each other. Here, the center cell structure 15 denotes a structure formed by a plurality of cells 2a arranged at a center part of the honeycomb structure body 4 in a plane perpendicular to a direction in which the cell 2 of the honeycomb structure body 4 is extended. The outermost circumference cell structure 16 denotes a structure formed by a plurality of cells 2b, which is formed in the plane described above, including a complete cell 2x formed at the outermost circumference of the honeycomb structure body 4. The plurality of the cells 2b including the complete cell 2x denotes the plurality of the cells 2b formed at a circumferential part arranged at an outer side with respect to the center cell structure 15. Further, the honeycomb structure 100 according to the present embodiment is formed such that a thickness of the boundary wall 8 arranged at the boundary part between the outermost circumference cell structure 16 and the center cell structure 15 is thicker than a thickness of the circumferential wall 3.

The honeycomb structure 100 according to the present embodiment achieves effects, in the honeycomb structure 100 with two or more cell structures separated by the boundary wall 8, capable of relieving the stress concentration generated near the boundary wall 8 and preventing deterioration of the mechanical strength. Further, in the honeycomb structure 100 according to the present invention, the deformation of the cell 2 near the boundary wall 8 is hardly generated in its manufacturing, and therefore the mechanical strength can be enhanced. For example, if the cell 2 near the boundary wall 8 is deformed, a crack might be generated from the deformed cell 2 as a starting point, however the honeycomb structure 100 according to the present invention can effectively prevent the generation of such a crack.

Here, FIG. 1 is a perspective view schematically showing the honeycomb structure according to an embodiment of the present invention. FIG. 2 is a plane view schematically showing an inflow end face of the honeycomb structure shown in FIG. 1. FIG. 3 is a cross-sectional view schematically showing a cross section along the X-X' line of FIG. 2.

In the present invention, the outermost circumference cell structure 16 denotes the cell structure including the complete cell 2x formed at the outermost circumference of the honeycomb structure body 4. Hereinafter, the cell 2 in which all of the circumferences of the cell 2 are defined by the partition walls 1 may be referred to as "complete cell". On the other hand, the cell 2 in which not all of the circumferences of the cell 2 are defined by the partition walls 1 and a part of the cell 2 is defined by the circumferential wall 3 may be referred to as "incomplete cell". Further, the cell 2 in which a part of the cell 2 is defined by the boundary wall 8 may be also referred to as "incomplete cell". The cells 2 formed in the honeycomb structure body 4 can be classified into the "complete cell" and the "incomplete cell".

In the present invention, the "cell structure" denotes a structure formed by a collection of repeated units formed in a plane perpendicular to a direction in which the cell 2 is extended, and each of the repeated unit is formed by one cell 2 defined by the partition walls 1 or a combination of a plurality of the cells 2. For example, in a case in which the cells having the same shape are regularly arranged in the plane described above, a region in which the cells having the same shape are arranged forms one cell structure. Further, in a case in which a combination of the plurality of the cells having different shapes forms one repeated unit, a region in which the repeated unit is arranged forms one cell structure.

In the present invention, two cell structures have "the different structures" denotes that when the two cell structures are compared, any one of a thickness of a partition wall, a cell density, and a cell shape is different between the two cell structures. Here, "the thickness of the partition wall is different" denotes that when the thicknesses of the partition walls are compared between the two cell structures, the difference of 25 µm or more is provided. Further, "the cell density is different" denotes that when the cell densities are compared between the two cell structures, the difference of 7 cells/cm$^2$ or more is provided.

In the present invention, "the center cell structure 15" is formed by one or more cell structure. On the other hand, "the outermost circumference cell structure 16" denotes a cell structure arranged at the outer side with respect to the center cell structure 15 and at an outermost circumferential part of the honeycomb structure body 4. Further, "the outermost circumference cell structure 16" is normally formed by one kind of the cell structure. Accordingly, regarding "the center cell structure 15", in a case in which only one cell structure is arranged at an inner side with respect to the outermost circumference cell structure 16, the one cell structure forms the center cell structure 15. Further, in a case in which two or more cell structures are arranged at the inner side with respect to the outermost circumference cell structure 16, each of the two or more cell structures forms the center cell structure 15. Further, in the cell structure forming the outermost circumference cell structure 16, the incomplete cell at the outermost circumference is not included in the cell forming the repeated unit. Further, in the cell structure forming the center cell structure 15, the incomplete cell in which a part of the cell 2 is defined by the boundary wall 8 is not also included in the cell forming the repeated unit.

In the honeycomb structure 100 shown in FIG. 1 through FIG. 3, the cells 2b arranged at the outer side with respect to the center cell structure 15 are formed to have the same shape, the same cell density, and the same cell pitch. Accordingly, the honeycomb structure body 4 of the honeycomb structure 100 shown in FIG. 1 through FIG. 3 is formed by two kinds of the cell structures of the center cell structure 15 and the outermost circumference cell structure 16. Further, an example of a configuration in which the center cell structure 15 has a plurality of kinds of the cell structures is described below.

"The thickness of the circumferential wall 3" can be obtained by an image analysis of an image of the inflow end face 11 or the outflow end face 12 of the honeycomb structure body 4 imaged by an imaging device. Specifically, at first, the inflow end face 11 or the outflow end face 12 of the honeycomb structure body 4 of the honeycomb structure 100 is imaged by the imaging device. Next, in the imaged image, the center of gravity O1 of the honeycomb structure body 4 is obtained. The center of gravity O1 of the honeycomb structure body 4 can be obtained as the center of gravity of the inflow end face 11 or the outflow end face 12 of the honeycomb structure body 4. Next, the complete cell 2x closest to the center of gravity O1 of the honeycomb structure body 4 among the complete cells 2x in the outermost circumference of the honeycomb structure body 4 is specified. Next, the center of gravity O2 of the specified complete cell 2x is obtained. Next, the center of gravity O1 of the honeycomb structure body 4 and the center of gravity O2 of the specified complete cell 2x are connected by a straight line, and a thickness of the circumferential wall 3 on an extended line of the straight line is measured. Here, the straight line connecting the center of gravity O1 of the honeycomb structure body 4 and the center of gravity O2 of the specified complete cell 2x is defined as "a straight line O1-O2". Next, "the straight line O1-O2" is moved by every 45° in a clockwise direction around the center of gravity O1 of the honeycomb structure body 4, and each thickness of the circumferential wall 3 on the extended line of the moved "straight line O1-O2" is measured. Namely, the thickness of the circumferential wall 3 is measured at seven points on "the straight line O1-O2" moved by each of 45°, 90°, 135°, 180°, 225°, 270° and 315°. An average value of the thicknesses of the circumferential wall 3 measured as described above at eight points is defined as "the thickness of the circumferential wall 3". The image analysis of the imaged image can be executed by using, for example, an image analysis software having a trade name of "NEXIV, VMR-1515" made by Nikon corporation.

"The thickness of the boundary wall 8" can be also obtained by the image analysis of an image of the inflow end face 11 or the outflow end face 12 of the honeycomb structure body 4 imaged by the imaging device. Specifically, at first, the inflow end face 11 or the outflow end face 12 of the honeycomb structure body 4 of the honeycomb structure 100 is imaged by the imaging device. Next, in the imaged image, the center of gravity O1 of the honeycomb structure body 4 is obtained. Next, the complete cell 2x closest to the center of gravity O1 of the honeycomb structure body 4 among the complete cells 2x in the outermost circumference of the honeycomb structure body 4 is specified. Next, the center of gravity O2 of the specified complete cell 2x is obtained. Next, the center of gravity O1 of the honeycomb structure body 4 and the center of gravity O2 of the specified complete cell 2x are connected by a straight line, and a thickness of the boundary wall 8 on the straight line is measured. Next, "the straight line O1-O2" is moved by every 45° in a clockwise direction around the center of gravity O1 of the honeycomb structure body 4, and each thickness of the boundary wall 8 on the moved straight line is measured. An average value of the thicknesses of the boundary wall 8 measured as described above at eight points is defined as "the thickness of the boundary wall 8". The image analysis of the imaged image can be executed by using a similar software used when the thickness of the circumferential wall 3 is measured.

In the honeycomb structure 100 according to the present invention, it is necessary that the thick ness of the boundary wall 8 is thicker than the thickness of the circumferential wall 3. For example, in a case in which the boundary wall 8 and the circumferential wall 3 have the same thickness, it is difficult to release the stress concentration generated near the boundary wall 8. In the honeycomb structure 100 according to the present embodiment, it is preferable that the thickness of the boundary wall 8 is 150% or more of the thickness of the circumferential wall 3. With such a configuration, deterioration of the mechanical strength of the honeycomb structure 100 can be effectively prevented. Further, it is more preferable that the thickness of the boundary wall 8 is in a range between 150% and 300% of the thickness of the circumferential wall 3, and it is further preferable that the thickness of the boundary wall 8 is in a range between 200% and 250% of the thickness of the circumferential wall 3.

Each of the cell shapes in the plane perpendicular to the direction in which the cell is extended is not limited to a specific shape. Examples of the cell shape which foul's the center cell structure and the outermost circumference cell structure include a polygonal shape such as a triangular shape, a quadrangular shape, a hexagonal shape, or an octagonal shape or the like. Further, the cells which form the center cell structure and the outermost circumference cell structure may be different in shape one another within each of the cell structures.

In the honeycomb structure according to the present embodiment, it is preferable that the cell density of the center cell structure is larger than the cell density of the outermost circumference cell structure. The honeycomb structure having such a configuration can make the exhaust gas easily flow into the cell arranged at the circumference in the plane perpendicular to the direction in which the cell is extended, and therefore it is preferable in a point in which the exhaust gas can be purified while effectively contacting the exhaust gas with the honeycomb structure.

The cell density of the center cell structure is preferably set in a range between 40 and 155 cells/cm$^2$, more preferably set in a range between 60 and 140 cells/cm$^2$, further more preferably set in a range between 75 and 110 cells/cm$^2$. If the cell density of the center cell structure is less than 40 cells/cm$^2$, the strength of the honeycomb structure may not be enhanced, and further it may be difficult to make the exhaust gas flow into the circumference. Further, if the cell density of the center cell structure exceeds 155 cells/cm$^2$, pressure loss of the honeycomb structure may be increased, and further clogging of the cell may be generated due to a catalyst loaded onto the cell in a case in which the cell loads the catalyst.

The cell density of the outermost circumference cell structure is preferably set in a range between 15 and 95 cells/cm$^2$, more preferably set in a range between 30 and 80 cells/cm$^2$, further more preferably set in a range between 40 and 65 cells/cm$^2$. If the cell density of the outermost circumference cell structure is less than 15 cells/cm$^2$, the strength of the honeycomb structure may be insufficient. Further, if the cell density of the outermost circumference cell structure exceeds 95 cells/cm$^2$, pressure loss of the honeycomb structure may be increased, and further clogging of the cell may be generated due to a catalyst loaded onto the cell in a case in which the cell loads the catalyst.

The thickness of the partition wall of the center cell structure is preferably set in a range between 0.05 and 0.21 mm, more preferably set in a range between 0.05 and 0.16 mm, further more preferably set in a range between 0.05 and 0.12 mm. If the thickness of the partition wall of the center cell structure is too thin, it is not preferable in points in which the strength of the honeycomb structure is insufficient and making the exhaust gas flow into the circumference becomes difficult. If the thickness of the partition wall of the center cell structure is too thick, it is not preferable in points in which a pressure loss of the honeycomb structure is increased and clogging of the cell is generated due to a catalyst loaded onto the cell in a case in which the cell loads the catalyst.

The thickness of the partition wall of the outermost circumference cell structure is preferably set in a range between 0.07 and 0.23 mm, more preferably set in a range between 0.07 and 0.18 mm, further more preferably set in a range between 0.07 and 0.15 mm. If the thickness of the partition wall of the outermost circumference cell structure is too thin, it is not preferable in points in which the strength of the honeycomb structure is insufficient and making the exhaust gas flow into the circumference becomes difficult. If the thickness of the partition wall of the outermost circumference cell structure is too thick, it is not preferable in points in which pressure loss of the honeycomb structure is increased and clogging of the cell is generated due to a catalyst loaded onto the cell in a case in which the cell loads the catalyst.

The thickness of the circumferential wall is preferably set in a range between 0.2 and 1.0 mm, more preferably set in a range between 0.3 and 0.8 mm, further more preferably set in a range between 0.4 and 0.6 mm. If the thickness of the circumferential wall is too thin, it is not preferable in a point in which the mechanical strength of the whole of the honeycomb structure is reduced. If the thickness of the circumferential wall is too thick, it is not preferable in points in which an opening area of the cell of the honeycomb structure is reduced and therefore pressure loss is increased.

The porosity of the partition wall of the honeycomb structure body is preferably set in a range between 10 and 55%, more preferably set in a range between 20 and 45%, further more preferably set in a range between 25 and 35%. If the porosity of the partition wall is less than 10%, when the honeycomb structure is used as a filter, pressure loss may be increased. If the porosity of the partition wall exceeds 55%, the strength of the honeycomb structure 100 is insufficient, and when the honeycomb structure is housed in a can body used in an exhaust gas purifying device, it is difficult to hold the honeycomb structure with enough holding force. The porosity of the partition wall is defined by a value measured by a mercury porosimeter (Mercury porosimeter). An example of the mercury porosimeter includes Autopore 9500 (trade name) made by Micromeritics corporation.

A main component of materials of the partition wall is preferably formed by various ceramics of oxide or non-oxide, metal or the like from a viewpoint of a strength, a heat resistance, a durability or the like. Specifically, the ceramics is preferably formed by material including at least one kind of materials selected from a material group consisted of, for example, cordierite, mullite, alumina, spinel, silicon carbide, silicon nitride and aluminum titanate. The metal is considered to use Fe—Cr—Al based metal, metallic silicon or the like. It is preferable that the main component is formed by one or two or more kinds of materials selected from those materials. It is more preferable that the main component is formed by one or two or more kinds of materials selected from a material group consisted of alumina, mullite, aluminum titanate, cordierite, silicon carbide, and silicon nitride from a viewpoint of a high strength, a high heat resistance or the like. Further, silicon carbide or silicon-silicon carbide composite material is especially suitable from a viewpoint of a high thermal conductivity, a high heat resistance or the like. Here, "the main component" denotes a component of 50 mass % or more, preferably 70 mass % or more, more preferably 80 mass % or more in all components of the materials of the partition wall.

A main component of materials of the boundary wall is preferably formed by various ceramics of oxide or non-oxide, metal or the like from a viewpoint of a strength, a heat resistance, a durability or the like. Further, it is preferable that the material of the boundary wall is the same as the material of the partition wall.

A main component of materials of the circumferential wall is preferably formed by various ceramics of oxide or non-oxide, metal or the like from a viewpoint of a strength, a heat resistance, a durability or the like. Further, it is preferable that the material of the circumferential wall is the same as the material of the partition wall. In the honeycomb structure according to the present embodiment, it is especially preferable that the partition wall, the boundary wall and the circumferential wall are formed as an integrally formed body formed by a single extrusion.

The whole shape of the honeycomb structure is not limited to a specific shape. The whole shape of the honeycomb structure according to the present embodiment is preferably formed such that each shape of the inflow end face and the outflow end face is formed in a circular shape or an oval shape, especially more preferably formed in a circular shape. Further, a size of the honeycomb structure is not limited to a specific size, and it is preferable that a length between the inflow end face and the outflow end face is set in a range between 50 and 254 mm. Further, in a case in which the whole shape of the honeycomb structure is formed in a round pillar shape, it is preferable that each diameter of the end faces is set in a range between 50 and 254 mm.

The honeycomb structure according to the present embodiment can be preferably used for a member for an exhaust gas purification of an internal combustion engine. For example, it can be preferably used as a catalyst carrier for loading the catalyst for the exhaust gas purification. The honeycomb structure according to the present embodiment may be formed such that the catalyst for the exhaust gas purification is loaded onto at least one of a surface of the partition wall of the honeycomb structure body and a pore of the partition wall.

Further, the honeycomb structure according to the present embodiment may be further provided with a plugging portion arranged at one of the end parts of the cell defined by the partition wall. Namely, the plugging portion is arranged at an open end at a side of the inflow end face or a side of the outflow end face of the cell to plug one of the end parts of the cell, and the honeycomb structure having such a configuration can be used as a filter which removes particulate matter in the exhaust gas.

Figure 4:
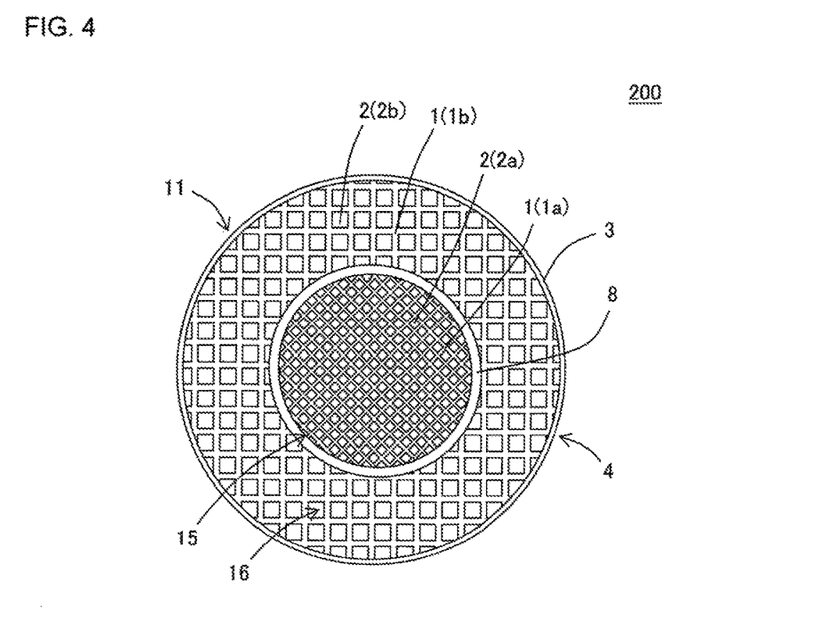
FIG. 4 is a plane view schematically showing an inflow end face of a honeycomb structure according to another embodiment of the present invention.

Next, another embodiment of the honeycomb structure according to the present invention is described with reference to FIG. 4. FIG. 4 is a plane view schematically showing the inflow end face of the honeycomb structure according to another embodiment of the present invention. As shown in FIG. 4, a honeycomb structure 200 according to the present embodiment is provided with a pillar-shaped honeycomb structure body 4 having porous partition walls 1 and a circumferential wall 3 arranged so as to surround a circumference of the partition walls 1. The honeycomb structure body 4 is provided with a center cell structure 15, an outermost circumference cell structure 16, and a boundary wall 8 which are arranged in a plane perpendicular to a direction in which a cell 2 is extended. Further, the center cell structure 15 and the outermost circumference cell structure 16 have different structures to each other. Further, similar to the honeycomb structure 100 shown in FIG. 1 through FIG. 3, a thickness of the boundary wall 8 is formed to be thicker than a thickness of the circumferential wall 3.

In the honeycomb structure 200 shown in FIG. 4, an arrangement direction of repeated units of a cell 2a in the center cell structure 15 is inclined with respect to an arrangement direction of repeated units of a cell 2b in the outermost circumference cell structure 16. Namely, the repeated units of the cell 2b in the outermost circumference cell structure 16 are arranged in a lateral direction of the paper surface of FIG. 4, while the repeated units of the cell 2a in the center cell structure 15 are arranged in a direction diagonally inclined to the lateral direction of the paper surface of FIG. 4. For example, the honeycomb structure 200 shown in FIG. 4 can be deemed to be a configuration in which the center cell structure 15 is arranged in a state in which it is rotated by approximately 45° around the center of gravity thereof in the clockwise direction in the honeycomb structure 100 shown in FIG. 1 through FIG. 3. With such a configuration, a generation of the stress concentration in a specific part can be prevented, and therefore an effect of enhancing strength can be obtained.

In the honeycomb structure 200 shown in FIG. 4, an angle between the arrangement direction of the repeated units of the cell 2b in the outermost circumference cell structure 16 and the arrangement direction of the repeated units of the cell 2a in the center cell structure 15 is not limited to a specific angle. However, in a case in which the arrangement direction of the repeated units of the cell 2a in the center cell structure 15 is inclined with respect to the arrangement direction of the repeated units of the cell 2b in the outermost circumference cell structure 16, it is preferable to be inclined by an angle from 10° or more but less than 50°. With a configuration in which the arrangement directions of the repeated units of cells 2a, 2b are inclined in such an angle range, the effects described above can be effectively achieved.

Figure 5:
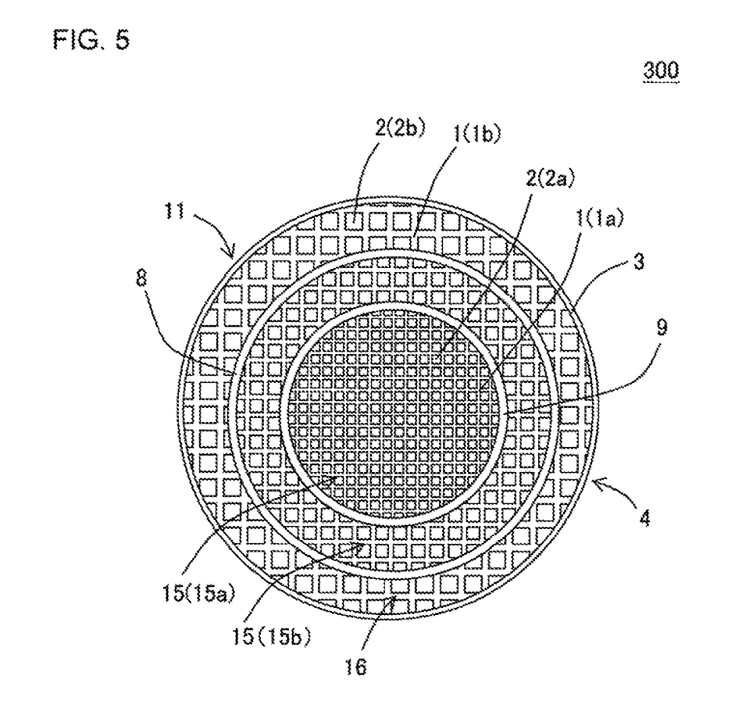
FIG. 5 is a plane view schematically showing an inflow end face of a honeycomb structure according to still another embodiment of the present invention.

Next, still another embodiment of the honeycomb structure according to the present invention is described with reference to FIG. 5. FIG. 5 is a plane view schematically showing the inflow end face of the honeycomb structure according to still another embodiment of the present invention. The honeycomb structure according to the present embodiment is formed such that a center cell structure arranged at an inner side with respect to an outermost circumference cell structure is formed by two or more cell structures. Namely, as shown in FIG. 5, a honeycomb structure 300 according to the present embodiment is provided with a pillar-shaped honeycomb structure body 4 having porous partition walls 1 and a circumferential wall 3 arranged so as to surround a circumference of the partition walls 1. The honeycomb structure body 4 is provided with a center cell structure 15, an outermost circumference cell structure 16, and a boundary wall 8 which are arranged in a plane perpendicular to a direction in which a cell 2 is extended. Further, the center cell structure 15 and the outermost circumference cell structure 16 have different structures to each other. Further, similar to the honeycomb structure 100 shown in FIG. 1 through FIG. 3, a thickness of the boundary wall 8 is formed to be thicker than a thickness of the circumferential wall 3.

In the honeycomb structure 300 shown in FIG. 5, the center cell structure 15 is formed by two cell structures. Namely, in the honeycomb structure 300, the center cell structure 15 is provided with a first center cell structure 15a arranged so as to be close to an inner side of the honeycomb structure body 4 and a second center cell structure 15b arranged so as to surround the first center cell structure 15a. Further, a center boundary wall 9 which defines a boundary is arranged at a boundary part between the first center cell structure 15a and the second center cell structure 15b. Here, "the center boundary wall 9" denotes a boundary wall arranged at the boundary part between the two center cell structures 15 which are doubly arranged.

In the honeycomb structure 300 according to the present embodiment, a thickness of the center boundary wall 9 is not limited to a specific thickness. For example, the thickness of the center boundary wall 9 may be thicker than the thickness of the circumferential wall 3, or alternatively the thickness of the center boundary wall 9 may be the same as the thickness of the circumferential wall 3. However, in the honeycomb structure 300 according to the present embodiment, it is preferable that the thickness of the center boundary wall 9 is thicker than the thickness of the circumferential wall 3. Further, it is more preferably that the thickness of the center boundary wall 9 is set in a range between 150% and 300% of the thickness of the circumferential wall 3, further more preferably set in a range between 200% and 250% of the thickness of the circumferential wall 3. The thickness of the center boundary wall 9 can be measured by a similar method to the method which measures the thickness of the boundary wall 8 arranged at the boundary part between the outermost circumference cell structure 16 and the center cell structure 15.

As described above, in the honeycomb structure 300 shown in FIG. 5, the center cell structure 15 is formed by the two cell structures. In this way, in a case in which the center cell structure 15 is formed by the two cell structures, it is preferable that the center boundary wall 9 which defines the boundary thereof is arranged. However, the boundary part between the first center cell structure 15a and the second center cell structure 15b may be formed by the partition walls 1 formed in a continuous or a discontinuous manner without arranging the center boundary wall 9.

(2) Manufacturing Method of Honeycomb Structure

Next, a method for manufacturing the honeycomb structure according to the present invention is described.

At first, plastic kneaded material for forming the honeycomb structure body is formed. The kneaded material for forming the honeycomb structure body can be formed by adding an additive such as binder or the like and water appropriately into the material as raw material powder selected from the material group suitable for the partition wall described above.

Next, by means of the extrusion of the formed kneaded material, a pillar-shaped honeycomb formed body having the partition walls which define a plurality of the cells and the circumferential wall arranged at the outermost circumference is obtained. In the extrusion, as a die for the extrusion, a configuration in which a slit having a reversed shape of the honeycomb formed body to be formed is formed on an extrusion surface of the kneaded material can be used. Especially, when the honeycomb structure according to the present invention is manufactured, as the die for the extrusion, it is preferable to use a configuration in which a slit is formed such that the cell structures in the center part and the circumferential part of the honeycomb formed body to be formed by the extrusion are different to each other. Further, in the die to be used, it is preferable that a ring shaped slit is formed at a boundary between the center part and the circumferential part in which the cell structures are different. By forming such a ring shaped slit, the boundary wall which defines the outermost circumference cell structure and the center cell structure is formed.

The obtained honeycomb formed body may be dried by, for example, a microwave and hot air. Further, the plugging portion may be arranged by plugging an open end of the cell with a similar material to the material used in manufacturing the honeycomb formed body.

Next, by firing the obtained honeycomb formed body, the honeycomb structure is obtained. A firing temperature and a firing atmosphere are different in raw material, and a person skilled in the art can select an appropriate firing temperature and an appropriate firing atmosphere suitable for the selected material. Further, the method for manufacturing the honeycomb structure according to the present invention is not limited to the method described above.

EXAMPLES

Example 1

To a cordierite forming raw material of 100 pts. mass, a dispersing medium of 35 pts. mass, an organic binder of 6 pts. mass and a dispersing agent of 0.5 pts. mass were added, respectively, followed by mixing and kneading, to prepare a kneaded material. As the cordierite forming raw material, alumina, aluminum hydroxide, kaolin, talc, and silica were used. As the dispersing medium, water was used. As a pore former, cokes having an average particle diameter of 1 through 10 μm was used. As the organic binder, hydroxypropylmethyl cellulose was used. As the dispersing agent, ethylene glycol was used.

Next, the kneaded material was extruded by using a honeycomb formed body preparing die, to obtain a honeycomb formed body in which the whole shape was a round pillar shape. In the extrusion, the extruding die was used in which slits were formed so that a cell structure of a central portion of the honeycomb formed body to be extruded differed from a cell structure of a circumferential portion thereof. Further, the die had a configuration in which a ring shaped slit was formed at a boundary between the center part and the circumferential part in which the cell structures were different.

Next, the honeycomb formed body was dried by a microwave drying machine, and further the honeycomb formed body was completely dried by a hot air drying machine, and then both end faces of the honeycomb formed body were cut and the honeycomb formed body was adjusted in a predetermined size.

Next, the dried honeycomb formed body was degreased and fired, and thereby a honeycomb structure according to an example 1 was manufactured. The honeycomb structure according to the example 1 had a round pillar shape in which a diameter of each end face was 118 mm. A length of the honeycomb structure according to the example 1 in a direction in which a cell was extended was 127 mm.

Further, in the honeycomb structure according to the example 1, the outermost circumference cell structure and the center cell structure had different structures to each other in a plane perpendicular to a direction in which a cell is extended. The center cell structure was formed by one kind of the cell structure, and therefore the honeycomb structure according to the example 1 had total two kinds of the cell structures including the outermost circumference cell structure and the center cell structure. A configuration having the total two kinds of the cell structures such as the honeycomb structure according to the example 1 is described as "2" in a column of "Kind of Cell Structure" in Table 1. For example, in a case in which the center cell structure was formed by two kinds of the cell structures, and the honeycomb structure had total three kinds of the cell structures including the outermost circumference cell structure and the center cell structure, it is described as "3" in the column of the "Kind of Cell Structure" in Table 1. Further, in the present example, in a case in which the center cell structure was formed by one kind of the cell structure, the center cell structure may be referred to as "first center cell structure". Further, in the present example, in a case in which the center cell structure was formed by two kinds of the cell structures, the center cell structure arranged at an inner side may be referred to as "first center cell structure", and the center cell structure arranged at an outer side than the first center cell structure may be referred to as "second center cell structure".

Further, the obtained honeycomb structure according to the example 1 had the boundary wall at the boundary part between the outermost circumference cell structure and the center cell structure. In the present example, the boundary wall arranged at the boundary part between the outermost circumference cell structure and the center cell structure as shown in the honeycomb structure according to the example 1 is merely referred to as "boundary wall". On the other hand, in a case in which the center cell structure is formed by two kinds of the cell structures, the boundary wall arranged at the boundary part between the first center cell structure and the second center cell structure is referred to as "center boundary wall".

In the center cell structure of the honeycomb structure according to the example 1, the thickness of the partition wall was 0.102 mm, the cell density is 93.0 cells/cm$^2$, and the cell shape was a quadrangular shape. Further, in the outermost circumference cell structure of the honeycomb structure according to the example 1, the thickness of the partition wall was 0.102 mm, the cell density was 62.0 cells/cm$^2$, and the cell shape was a quadrangular shape. In a column of "Cell Structure" in FIG. 1, each of the thickness of the partition wall, the cell density and the cell shape in the center cell structure and the outermost circumference cell structure is shown.

Further, the center cell structure of the honeycomb structure according to the example 1 had a circular shape at the end face of the honeycomb structure body, and a diameter thereof was 84 mm.

Further, the thickness of the boundary wall and the thickness of the circumferential wall of the honeycomb structure were measured by a method described below. At first, the inflow end face of the honeycomb structure body of the honeycomb structure was imaged by an imaging device. Next, in the imaged image, the center of gravity O1 of the honeycomb structure body was obtained. Next, the complete cell closest to the center of gravity O1 of the honeycomb structure body among the complete cells in the outermost circumference of the honeycomb structure body was specified. Next, the center of gravity O2 of the specified complete cell was obtained. Next, the center of gravity O1 of the honeycomb structure body and the center of gravity O2 of the specified complete cell were connected by a straight line, and the thickness of the boundary wall on the straight line was measured. Further, the straight line was extended and the thickness of the circumferential wall on the extended line of the straight line was measured. Next, the straight line was moved by every 45° in a clockwise direction around the center of gravity O1 of the honeycomb structure body, and each of the thickness of the boundary wall on the moved straight line and the thickness of the circumferential wall on the extended line of the moved straight line was measured. An average value of the thicknesses of the boundary wall measured as described above at eight points was defined as "the thickness of the boundary wall". Further, an average value of the thicknesses of the circumferential wall measured as described above at eight points was defined as "the thickness of the circumferential wall". The image analysis of the imaged image was executed by using an image analysis software having a trade name of "NEXIV, VMR-1515" made by Nikon corporation.

In the honeycomb structure according to the example 1, the thickness of the boundary wall was 0.35 mm, and the thickness of the circumferential wall was 0.30 mm. "Thickness of Boundary Wall" and "Thickness of Circumferential Wall" in the example 1 are shown in Table 2.

Further, "ratio (%) of the thickness of the boundary wall with respect to the thickness of the circumferential wall" was obtained from the measured "thickness of the boundary wall" and the measured "thickness of the circumferential wall". The "ratio (%) of the thickness of the boundary wall with respect to the thickness of the circumferential wall" denotes a percentage of a value of the thickness of the boundary wall (mm) divided by the thickness of the circumferential wall (mm). The value of the "Ratio (%) of Thickness of Boundary Wall with respect to Thickness of Circumferential Wall" of the honeycomb structure according to the example 1 is shown in Table 2.

In the honeycomb structure according to the example 1, an angle between the arrangement direction of the repeated units of the cells in the outermost circumference cell structure and the arrangement direction of the repeated units of the cells in the center cell structure was 0°. The angle between the two arrangement directions described above is shown in a column of "Incline (°) of Cell Arrangement of First Center Cell Structure" in Table 2.

In the honeycomb structure according to the example 1, the porosity of the partition wall was 35%. The porosity of the partition wall was a value measured with Autopore 9500 (trade name) manufactured by Micromeritics. Table 2 shows a value of the porosity of the partition wall in a column of "the porosity (%) of the partition wall".

Further, as to the honeycomb structure according to the example 1, "isostatic strength evaluation" was executed by a method described below. The result of the evaluation is shown in a column of "Strength Evaluation (Relative Evaluation)" in Table 2.

Isostatic Strength Evaluation

An isostatic strength was measured on the basis of an isostatic breakdown strength test stipulated in a car standard (JASO Standard) M505-87 issued by the society of Automotive Engineers of Japan. The isostatic breakdown strength test is a test of placing the honeycomb structure in a tubular container of rubber and closing the container with a lid made of an aluminum plate to perform an isotropic pressurizing compression in water. That is, the isostatic breakdown strength test is a test which simulates compressive load application in a case of holding a circumferential surface of the honeycomb structure in a can member. The isostatic strength measured by this isostatic breakdown strength test is indicated by an adding pressure value (MPa) when the honeycomb structure breaks. In the isostatic strength evaluation of the present example, relative evaluation was performed by comparing an adding pressure value (MPa) of the honeycomb structure of each of Comparative Examples 1, 7 and 11 of standards with an adding pressure value (MPa) of the honeycomb structure of an evaluation target. Additionally, in Examples 1 to 23 and Comparative Examples 2 to 6, Comparative Example 1 was used as the standard. In Examples 24 to 36 and Comparative Examples 8 to 10, Comparative Example 7 was used as the standard. In Examples 37 to 44 and Comparative Examples 12 to 14, Comparative Example 11 was used as the standard. Judgment standards of the evaluation are as follows.

Evaluation A: In a case in which the isostatic strength is improved more than 30% compared to the standard, the evaluation thereof is determined as "excellent".

Evaluation B: In a case in which the isostatic strength is similar to the standard (within ±30%), the evaluation thereof is determined as "good".

Evaluation C: In a case in which the isostatic strength is less than 70% of the standard, the evaluation thereof is determined as "failure".

TABLE 1

| | | First Center Cell Structure | | | Second Center Cell Structure | | | Outermost Circumference Cell Structure | | |
|---|---|---|---|---|---|---|---|---|---|---|
| | Kind of Cell Structure (kind) | Thickness of Partition Wall (mm) | Cell Density (cells/cm$^2$) | Cell Shape | Thickness of Partition Wall (mm) | Cell Density (cells/cm$^2$) | Cell Shape | Thickness of Partition Wall (mm) | Cell Density (cells/cm$^2$) | Cell Shape |
| Comparative example 1 | 1 | — | — | — | — | — | — | 0.102 | 62.0 | Quadrangular |
| Comparative example 2 | 2 | 0.102 | 93.0 | Quadrangular | — | — | — | 0.102 | 62.0 | Quadrangular |
| Comparative example 3 | 2 | 0.102 | 93.0 | Quadrangular | — | — | — | 0.102 | 62.0 | Quadrangular |
| Example 1 | 2 | 0.102 | 93.0 | Quadrangular | — | — | — | 0.102 | 62.0 | Quadrangular |
| Example 2 | 2 | 0.102 | 93.0 | Quadrangular | — | — | — | 0.102 | 62.0 | Quadrangular |
| Example 3 | 2 | 0.102 | 93.0 | Quadrangular | — | — | — | 0.102 | 62.0 | Quadrangular |
| Example 4 | 2 | 0.102 | 93.0 | Quadrangular | — | — | — | 0.102 | 62.0 | Quadrangular |
| Example 5 | 2 | 0.102 | 93.0 | Quadrangular | — | — | — | 0.102 | 62.0 | Quadrangular |
| Example 6 | 2 | 0.102 | 93.0 | Quadrangular | — | — | — | 0.102 | 62.0 | Quadrangular |
| Comparative example 4 | 3 | 0.102 | 93.0 | Quadrangular | 0.076 | 116.25 | Quadrangular | 0.102 | 62.0 | Quadrangular |
| Comparative example 5 | 3 | 0.102 | 93.0 | Quadrangular | 0.076 | 116.25 | Quadrangular | 0.102 | 62.0 | Quadrangular |
| Example 7 | 3 | 0.102 | 93.0 | Quadrangular | 0.076 | 116.25 | Quadrangular | 0.102 | 62.0 | Quadrangular |
| Example 8 | 3 | 0.102 | 93.0 | Quadrangular | 0.076 | 116.25 | Quadrangular | 0.102 | 62.0 | Quadrangular |
| Example 9 | 2 | 0.102 | 93.0 | Quadrangular | — | — | — | 0.102 | 62.0 | Quadrangular |
| Example 10 | 2 | 0.102 | 93.0 | Quadrangular | — | — | — | 0.102 | 62.0 | Quadrangular |
| Example 11 | 2 | 0.102 | 93.0 | Quadrangular | — | — | — | 0.102 | 62.0 | Quadrangular |
| Comparative example 6 | 2 | 0.102 | 93.0 | Quadrangular | — | — | — | 0.102 | 62.0 | Quadrangular |
| Example 12 | 2 | 0.102 | 93.0 | Quadrangular | — | — | — | 0.102 | 62.0 | Quadrangular |
| Example 13 | 2 | 0.102 | 93.0 | Quadrangular | — | — | — | 0.102 | 62.0 | Quadrangular |
| Example 14 | 2 | 0.102 | 93.0 | Quadrangular | — | — | — | 0.102 | 62.0 | Quadrangular |
| Example 15 | 2 | 0.102 | 93.0 | Quadrangular | — | — | — | 0.102 | 62.0 | Quadrangular |
| Example 16 | 3 | 0.102 | 93.0 | Quadrangular | 0.076 | 116.25 | Quadrangular | 0.102 | 62.0 | Quadrangular |
| Example 17 | 2 | 0.102 | 93.0 | Hexagonal | — | — | — | 0.102 | 62.0 | Quadrangular |
| Example 18 | 2 | 0.102 | 93.0 | Hexagonal | — | — | — | 0.102 | 62.0 | Quadrangular |
| Example 19 | 2 | 0.102 | 93.0 | Hexagonal | — | — | — | 0.102 | 62.0 | Quadrangular |
| Example 20 | 2 | 0.076 | 93.0 | Quadrangular | — | — | — | 0.102 | 62.0 | Quadrangular |
| Example 21 | 2 | 0.051 | 139.5 | Quadrangular | — | — | — | 0.102 | 62.0 | Quadrangular |
| Example 22 | 2 | 0.089 | 116.3 | Quadrangular | — | — | — | 0.102 | 62.0 | Quadrangular |
| Example 23 | 2 | 0.127 | 46.5 | Quadrangular | — | — | — | 0.102 | 62.0 | Quadrangular |

TABLE 2

| | Thickness of Boundary Wall (mm) | | Thickness of Circumferential Wall (mm) | Ratio of Thickness of Boundary Wall with respect to Thickness of Circumferential Wall (%) | | Incline of Cell Arrangement of First Center Cell Structure (°) | Incline of Cell Arrangement of Second Center Cell Structure (°) | Porosity of Partition Wall (%) | Strength Evaluation (Relative Evaluation) |
|---|---|---|---|---|---|---|---|---|---|
| | Boundary Wall | Center Boundary Wall | | Boundary Wall | Center Boundary Wall | | | | |
| Comparative example 1 | — | — | 0.30 | — | — | — | — | 35 | standard |
| Comparative example 2 | 0.20 | — | 0.30 | 67 | — | 0 | — | 35 | C |
| Comparative example 3 | 0.30 | — | 0.30 | 100 | — | 0 | — | 35 | C |
| Example 1 | 0.35 | — | 0.30 | 117 | — | 0 | — | 35 | B |
| Example 2 | 0.40 | — | 0.30 | 133 | — | 0 | — | 35 | B |
| Example 3 | 0.45 | — | 0.30 | 150 | — | 0 | — | 35 | A |
| Example 4 | 0.50 | — | 0.30 | 167 | — | 0 | — | 35 | A |
| Example 5 | 0.55 | — | 0.30 | 183 | — | 0 | — | 35 | A |
| Example 6 | 0.60 | — | 0.30 | 200 | — | 0 | — | 35 | A |
| Comparative example 4 | 0.30 | 0.30 | 0.30 | 100 | 100 | 0 | — | 35 | C |
| Comparative example 5 | 0.35 | 0.30 | 0.30 | 117 | 100 | 0 | 0 | 35 | C |
| Example 7 | 0.40 | 0.35 | 0.30 | 133 | 117 | 0 | 0 | 35 | B |
| Example 8 | 0.45 | 0.40 | 0.30 | 150 | 133 | 0 | 0 | 35 | B |
| Example 9 | 0.50 | 0.45 | 0.30 | 167 | 150 | 0 | 0 | 35 | A |
| Example 10 | 0.40 | — | 0.30 | 133 | — | 10 | — | 35 | B |

TABLE 2-continued

| | Thickness of Boundary Wall (mm) | | Thickness of Circumferential Wall (mm) | Ratio of Thickness of Boundary Wall with respect to Thickness of Circumferential Wall (%) | | Incline of Cell Arrangement of First | Incline of Cell Arrangement of Second | Porosity of | Strength |
|---|---|---|---|---|---|---|---|---|---|
| | Boundary Wall | Center Boundary Wall | | Boundary Wall | Center Boundary Wall | Center Cell Structure (°) | Center Cell Structure (°) | Partition Wall (%) | Evaluation (Relative Evaluation) |
| Example 11 | 0.40 | — | 0.30 | 133 | — | 30 | — | 35 | B |
| Comparative example 6 | 0.30 | — | 0.30 | 100 | — | 45 | — | 35 | C |
| Example 12 | 0.35 | — | 0.30 | 117 | — | 45 | — | 35 | B |
| Example 13 | 0.40 | — | 0.30 | 133 | — | 45 | — | 35 | B |
| Example 14 | 0.45 | — | 0.30 | 150 | — | 45 | — | 35 | A |
| Example 15 | 0.50 | — | 0.30 | 167 | — | 45 | — | 35 | A |
| Example 16 | 0.50 | 0.45 | 0.30 | 167 | 150 | 45 | 45 | 35 | A |
| Example 17 | 0.40 | — | 0.30 | 133 | — | 0 | 0 | 35 | B |
| Example 18 | 0.50 | — | 0.30 | 167 | — | 0 | — | 35 | A |
| Example 19 | 0.60 | — | 0.30 | 200 | — | 0 | — | 35 | A |
| Example 20 | 0.60 | — | 0.30 | 200 | — | 0 | — | 35 | A |
| Example 21 | 0.60 | — | 0.30 | 200 | — | 0 | — | 35 | A |
| Example 22 | 0.60 | — | 0.30 | 200 | — | 0 | — | 35 | A |
| Example 23 | 0.60 | — | 0.30 | 200 | — | 0 | — | 35 | A |

Examples 2 Through 23, Comparative Examples 1 Through 6

Each of the honeycomb structures of the examples 2 through 23 and the comparative examples 1 through 6 was manufactured in accordance with "Kind of Cell Structure", "existence or absence of boundary wall" and "Cell Structure" shown in Table 1 and "Thickness of Boundary Wall" shown in Table 2.

In each of the examples 7, 8, 16 and the comparative examples 4, 5, the center cell structure had "First Center Cell Structure" and "Second Center Cell Structure" as shown in FIG. 1. Further, the first center cell structure had a circular shape at the end face of the honeycomb structure body, and the diameter thereof was 68 mm. The second center cell structure had a circular shape at the end face of the honeycomb structure body, and the diameter thereof was 96 mm. In each of the examples 7, 8, 16 and the comparative examples 4, 5, the thickness of the center boundary wall was also measured. Further, "the ratio (%) of the thickness of the center boundary wall with respect to the thickness of the circumferential wall" was obtained from the measured thickness of the center boundary wall and the measured thickness of the circumferential wall. "The ratio (%) of the thickness of the center boundary wall with respect to the thickness of the circumferential wall" denotes a percentage of a value of the thickness of the center boundary wall (mm) divided by the thickness of the circumferential wall (mm). A value of "the ratio (%) of the thickness of the center boundary wall with respect to the thickness of the circumferential wall" of each of the honeycomb structures of the examples 7, 8, 16 and the comparative examples 4, 5 is shown in a column of "Center Boundary Wall" of "Ratio of Thickness of Boundary Wall with respect to Thickness of Circumferential Wall (%)" in Table 2.

Further, in each of the examples 10 through 16 and the comparative example 6, "the incline (°) of the cell arrangement of the first center cell structure" and "the incline (°) of the cell arrangement of the second center cell structure" were set in accordance with those shown in Table 2.

Further, in the comparative example 1, the whole of the honeycomb structure body was formed by one kind of the cell structure. The thickness of the partition wall, the cell density, and the cell shape shown in "Outermost Circumference Cell Structure" in Table 1 shows the cell structure of the honeycomb structure body of the comparative example 1.

Examples 24 Through 36, Comparative Examples 7 Through 10

Each of the honeycomb structures of the examples 24 through 36 and the comparative examples 7 through 10 was manufactured in accordance with "Kind of Cell Structure", "existence or absence of boundary wall" and "Cell Structure" shown in Table 3 and "Thickness of Boundary Wall" shown in Table 4.

In each of the examples 28, 29, 33 and the comparative examples 9, 10, the center cell structure had "First Center Cell Structure" and "Second Center Cell Structure" as shown in Table 3. Further, the first center cell structure had a circular shape at the end face of the honeycomb structure body, and the diameter thereof was 68 mm. The second center cell structure had a circular shape at the end face of the honeycomb structure body, and the diameter thereof was 96 mm.

Further, in each of the examples 31 through 33, "the incline (°) of the cell arrangement of the first center cell structure" and "the incline (°) of the cell arrangement of the second center cell structure" were set in accordance with those shown in Table 4.

In the comparative example 7, the whole of the honeycomb structure body was formed by one kind of the cell structure. The thickness of the partition wall, the cell density, and the cell shape shown in "Outermost Circumference Cell Structure" in Table 3 shows the cell structure of the honeycomb structure body of the comparative example 7.

Examples 37 Through 44, Comparative Examples 11 Through 14

Each of the honeycomb structures of the examples 37 through 44 and the comparative examples 11 through 14 was manufactured in accordance with "Kinds of Cell Structure", "existence or absence of boundary wall" and "Cell Structure" shown in Table 5 and "Thickness of Boundary Wall" and "Porosity of Partition Wall" shown in Table 6.

Further, in each of the examples 41 through 44 and the comparative example 14, "the incline (°) of the cell arrangement of the first center cell structure" was set in accordance with that shown in Table 6.

In the comparative example 11, the whole of the honeycomb structure body was formed by one kind of the cell structure. The thickness of the partition wall, the cell density, and the cell shape shown in "Outermost Circumference Cell Structure" in Table shows the cell structure of the honeycomb structure body of the comparative example 11.

In each of the honeycomb structures of the examples 2 through 44 and the comparative examples 1 through 14, "the isostatic strength evaluation" was executed by the method similar to that of the example 1. Each evaluation result is shown in a column of "Strength Evaluation (Relative Evaluation)" in Table 2, Table 4, or Table 6.

TABLE 3

| | | Cell Structure | | | | | | | |
|---|---|---|---|---|---|---|---|---|---|
| | | First Center Cell Structure | | | Second Center Cell Structure | | | Outermost Circumference Cell Structure | | |
| | Kind of Cell Structure (kind) | Thickness of Partition Wall (mm) | Cell Density (cells/cm²) | Cell Shape | Thickness of Partition Wall (mm) | Cell Density (cells/cm²) | Cell Shape | Thickness of Partition Wall (mm) | Cell Density (cells/cm²) | Cell Shape |
| Comparative example 7 | 1 | — | — | — | — | — | — | 0.127 | 46.5 | Quadrangular |
| Comparative example 8 | 2 | 0.076 | 93.0 | Quadrangular | — | — | — | 0.127 | 46.5 | Quadrangular |
| Example 24 | 2 | 0.076 | 93.0 | Quadrangular | — | — | — | 0.127 | 46.5 | Quadrangular |
| Example 25 | 2 | 0.076 | 93.0 | Quadrangular | — | — | — | 0.127 | 46.5 | Quadrangular |
| Example 26 | 2 | 0.076 | 93.0 | Quadrangular | — | — | — | 0.127 | 46.5 | Quadrangular |
| Example 27 | 2 | 0.076 | 93.0 | Quadrangular | — | — | — | 0.127 | 46.5 | Quadrangular |
| Comparative example 9 | 3 | 0.102 | 93.0 | Quadrangular | 0.076 | 116.25 | Quadrangular | 0.127 | 46.5 | Quadrangular |
| Comparative example 10 | 3 | 0.102 | 93.0 | Quadrangular | 0.076 | 116.25 | Quadrangular | 0.127 | 46.5 | Quadrangular |
| Example 28 | 3 | 0.102 | 93.0 | Quadrangular | 0.076 | 116.25 | Quadrangular | 0.127 | 46.5 | Quadrangular |
| Example 29 | 3 | 0.102 | 93.0 | Quadrangular | 0.076 | 116.25 | Quadrangular | 0.127 | 46.5 | Quadrangular |
| Example 30 | 2 | 0.102 | 93.0 | Quadrangular | — | — | — | 0.127 | 46.5 | Quadrangular |
| Example 31 | 2 | 0.102 | 93.0 | Quadrangular | — | — | — | 0.127 | 46.5 | Quadrangular |
| Example 32 | 2 | 0.102 | 93.0 | Quadrangular | — | — | — | 0.127 | 46.5 | Quadrangular |
| Example 33 | 3 | 0.102 | 93.0 | Quadrangular | 0.076 | 116.25 | Quadrangular | 0.127 | 46.5 | Quadrangular |
| Example 34 | 2 | 0.102 | 93.0 | Hexagonal | — | — | — | 0.127 | 46.5 | Quadrangular |
| Example 35 | 2 | 0.102 | 93.0 | Hexagonal | — | — | — | 0.127 | 46.5 | Quadrangular |
| Example 36 | 2 | 0.102 | 93.0 | Hexagonal | — | — | — | 0.127 | 46.5 | Quadrangular |

TABLE 4

| | Thickness of Boundary Wall (mm) | | Thickness of Circumferential Wall (mm) | Ratio of Thickness of Boundary Wall with respect to Thickness of Circumferential Wall (%) | | Incline of Cell Arrangement of First Center Cell Structure (°) | Incline of Cell Arrangement of Second Center Cell Structure (°) | Porosity of Partition Wall (%) | Strength Evaluation (Relative Evaluation) |
|---|---|---|---|---|---|---|---|---|---|
| | Boundary Wall | Center Boundary Wall | | Boundary Wall | Center Boundary Wall | | | | |
| Comparative example 7 | — | — | 0.3 | — | — | | | 35 | standard |
| Comparative example 8 | 0.30 | — | 0.3 | 100 | — | 0 | — | 35 | C |
| Example 24 | 0.40 | — | 0.3 | 133 | — | 0 | — | 35 | B |
| Example 25 | 0.50 | — | 0.3 | 167 | — | 0 | — | 35 | A |
| Example 26 | 0.60 | — | 0.3 | 200 | — | 0 | — | 35 | A |
| Example 27 | 0.70 | — | 0.3 | 233 | — | 0 | — | 35 | A |
| Comparative example 9 | 0.30 | 0.30 | 0.3 | 100 | 100 | 0 | 0 | 35 | C |
| Comparative example 10 | 0.40 | 0.30 | 0.3 | 133 | 100 | 0 | 0 | 35 | C |
| Example 28 | 0.50 | 0.40 | 0.3 | 167 | 133 | 0 | 0 | 35 | B |
| Example 29 | 0.60 | 0.50 | 0.3 | 200 | 167 | 0 | 0 | 35 | A |
| Example 30 | 0.50 | — | 0.3 | 167 | — | 10 | — | 35 | A |
| Example 31 | 0.50 | — | 0.3 | 167 | — | 30 | — | 35 | A |
| Example 32 | 0.50 | — | 0.3 | 167 | — | 45 | — | 35 | A |
| Example 33 | 0.50 | 0.60 | 0.3 | 167 | 200 | 45 | 45 | 35 | A |
| Example 34 | 0.40 | — | 0.3 | 133 | — | 0 | — | 35 | B |
| Example 35 | 0.50 | — | 0.3 | 167 | — | 0 | — | 35 | A |
| Example 36 | 0.60 | — | 0.3 | 200 | — | 0 | — | 35 | A |

TABLE 5

| | | First Center Cell Structure | | | Outermost Circumference Cell Structure | | |
|---|---|---|---|---|---|---|---|
| | Kind of Cell Structure (kind) | Thickness of Partition Wall (mm) | Cell Density (cells/cm$^2$) | Cell Shape | Thickness of Partition Wall (mm) | Cell Density (cells/cm$^2$) | Cell Shape |
| Comparative example 11 | 1 | — | — | — | 0.203 | 46.5 | Quadrangular |
| Comparative example 12 | 2 | 0.152 | 62.0 | Quadrangular | 0.203 | 46.5 | Quadrangular |
| Comparative example 13 | 2 | 0.152 | 62.0 | Quadrangular | 0.203 | 46.5 | Quadrangular |
| Example 37 | 2 | 0.152 | 62.0 | Quadrangular | 0.203 | 46.5 | Quadrangular |
| Example 38 | 2 | 0.152 | 62.0 | Quadrangular | 0.203 | 46.5 | Quadrangular |
| Example 39 | 2 | 0.152 | 62.0 | Quadrangular | 0.203 | 46.5 | Quadrangular |
| Example 40 | 2 | 0.152 | 62.0 | Quadrangular | 0.203 | 46.5 | Quadrangular |
| Comparative example 14 | 2 | 0.152 | 62.0 | Quadrangular | 0.203 | 46.5 | Quadrangular |
| Example 41 | 2 | 0.152 | 62.0 | Quadrangular | 0.203 | 46.5 | Quadrangular |
| Example 42 | 2 | 0.152 | 62.0 | Quadrangular | 0.203 | 46.5 | Quadrangular |
| Example 43 | 2 | 0.152 | 62.0 | Quadrangular | 0.203 | 46.5 | Quadrangular |
| Example 44 | 2 | 0.152 | 62.0 | Quadrangular | 0.203 | 46.5 | Quadrangular |

TABLE 6

| | Thickness of Boundary Wall (mm) | Thickness of Circumferential Wall (mm) | Ratio of Thickness of Boundary Wall with respect to Thickness of Circumferential Wall (%) | Incline of Cell Arrangement of First Center Cell Structure (°) | Porosity of Partition Wall (%) | Strength Evaluation (Relative Evaluation) |
|---|---|---|---|---|---|---|
| Comparative example 11 | — | 0.3 | — | — | 65 | standard |
| Comparative example 12 | 0.20 | 0.3 | 67 | 0 | 65 | C |
| Comparative example 13 | 0.30 | 0.3 | 100 | 0 | 65 | C |
| Example 37 | 0.40 | 0.3 | 133 | 0 | 65 | B |
| Example 38 | 0.50 | 0.3 | 167 | 0 | 65 | A |
| Example 39 | 0.60 | 0.3 | 200 | 0 | 65 | A |
| Example 40 | 0.70 | 0.3 | 233 | 0 | 65 | A |
| Comparative example 14 | 0.30 | 0.3 | 100 | 45 | 65 | C |
| Example 41 | 0.40 | 0.3 | 133 | 45 | 65 | B |
| Example 42 | 0.50 | 0.3 | 167 | 45 | 65 | A |
| Example 43 | 0.60 | 0.3 | 200 | 45 | 65 | A |
| Example 44 | 0.70 | 0.3 | 233 | 45 | 65 | A |

Result

Each of the honeycomb structures of the examples 1 through 44 is formed such that the thickness of the boundary wall is thicker than the thickness of the circumferential wall, and it is found that the isostatic strength is higher compared to that of the honeycomb structure of each of the comparative examples defined as the standards. On the other hand, in the honeycomb structure formed such that the boundary wall has the thickness thinner than the thickness of the circumferential wall as shown in the comparative example 2, or in the honeycomb structure formed such that the boundary wall has the thickness as same as the thickness of the circumferential wall as shown in the comparative example 3, the isostatic strength is reduced compared to that of the honeycomb structure of the comparative example 1. Namely, in the honeycomb structure having the different structures between the outermost circumference cell structure and the center cell structure, in a case in which the thickness of the boundary wall is a similar to or less than the thickness of the circumferential wall, in the same pressurizing condition as the comparative example 1 defined as the standard, a part having the maximum stress value larger than that in the comparative example 1 is generated near the boundary wall. Accordingly, it is found that, in the honeycomb structure having the different structures between the outermost circumference cell structure and the center cell structure, as shown in each of the comparative examples, in a case in which the thickness of the boundary wall is similar to or less than the thickness of the circumferential wall, the isostatic strength is reduced.

Further, it is found that the isostatic strength is improved as each of "the incline (°) of the cell arrangement of the first center cell structure" and "the incline (°) of the cell arrangement of the second center cell structure" becomes closer to 45°.

Further, it is found that even if the porosity of the partition wall of the honeycomb structure is low as shown in each of the examples 1 through 36, or even if the porosity of the partition wall of the honeycomb structure is high as shown in each of the examples 37 through 44, the isostatic strength is effectively improved by setting the thickness of the boundary wall to be thicker than the thickness of the circumferential wall.

The honeycomb structure according to the present invention can be used as a catalyst carrier which loads a catalyst for purifying the exhaust gas emitted from a gasoline engine, a diesel engine or the like, or can be used as a filter for purifying the exhaust gas.

DESCRIPTION OF REFERENCE NUMERALS

1: partition walls, 2: cell, 2a: cell (cell in center cell structure), 2b: cell (cell in outermost circumference cell structure), 2x: complete cell, 3: circumferential wall, 4: honeycomb structure body, 8: boundary wall, 9: center boundary wall, 11: inflow end face, 12: outflow end face, 15: center cell structure, 15a: first center cell structure, 15b: second center cell structure, 16: outermost circumference cell structure, 100, 200, 300: honeycomb structure.

What is claimed is:

1. A honeycomb structure comprising:
a pillar-shaped honeycomb structure body having porous partition walls which define a plurality of cells to function as passages of liquid extended from an inflow end face toward an outflow end face, and a circumferential wall arranged to surround a circumference of the partition walls;
wherein a cell in which the whole circumference is defined by the partition walls among the cells is referred to as a complete cell, the honeycomb structure body has an outermost circumference cell structure including the complete cell formed at the outermost circumference of the honeycomb structure body, a center cell structure formed by a plurality of the cells formed at a center part at an inner side with respect to the outermost circumference cell structure, and a boundary wall arranged at a boundary part between the outermost circumference cell structure and the center cell structure,
wherein the outermost circumference cell structure and the center cell structure are formed by different structures to each other,
wherein a thickness of the boundary wall is set to be thicker than a thickness of the circumferential wall,
wherein the circumferential wall has a smooth, curved surface, and
wherein the partition walls, boundary wall and circumferential wall are formed as an integrally formed body.

2. The honeycomb structure according to claim 1, wherein the thickness of the boundary wall is set to be 150% or more of the thickness of the circumferential wall.

3. The honeycomb structure according to claim 2, wherein the thickness of the boundary wall is set in a range between 150% and 300% of the thickness of the circumferential wall.

4. The honeycomb structure according to claim 1, wherein a cell density of the center cell structure is set to be larger than a cell density of the outermost circumference cell structure.

5. The honeycomb structure according to claim 1, wherein an arrangement direction of repeated units of the cell in the center cell structure is inclined by an angle in a range between 10° and 50° with respect to an arrangement direction of repeated units of the cell in the outermost circumference cell structure.

6. The honeycomb structure according to claim 1, wherein the center cell structure is formed by two or more cell structures having different cell densities, and a center boundary wall is arranged at a boundary part of the two or more cell structures having the different cell densities.

7. The honeycomb structure according to claim 1, wherein the inflow end face and the outflow end face each have a circular shape or an oval shape.

* * * * *